United States Patent [19]
Hoffmann et al.

[11] 3,797,563
[45] Mar. 19, 1974

[54] PORTABLE FOOD SERVICE EQUIPMENT

[75] Inventors: Carter Clifford Hoffmann, Lake Forest; Richard R. Berger, Antioch, both of Ill.

[73] Assignee: Carter-Hoffmann Corp., Mundelein, Ill.

[22] Filed: Nov. 18, 1971

[21] Appl. No.: 200,133

[52] U.S. Cl.................... 165/48, 165/137, 219/387
[51] Int. Cl............................................... F25b 29/00
[58] Field of Search................. 165/27, 48, 76, 137; 126/268, 276; 219/433, 386, 387, 437, 523; 62/457, DIG. 15; 312/236

[56] References Cited
UNITED STATES PATENTS

| | | | |
|---|---|---|---|
| 2,717,766 | 9/1955 | Becker | 165/137 X |
| 2,948,798 | 8/1960 | Ness | 219/387 |
| 2,462,115 | 2/1949 | Luecke | 62/DIG. 15 |
| 1,235,056 | 7/1917 | Renner | 165/48 X |
| 2,471,260 | 5/1949 | Chapman | 219/436 |
| 3,516,485 | 6/1970 | Rhoads et al. | 165/48 X |
| 1,994,909 | 3/1935 | Ehrgott | 219/437 |

FOREIGN PATENTS OR APPLICATIONS

| | | | |
|---|---|---|---|
| 923,196 | 4/1963 | Great Britain | 219/523 |

*Primary Examiner*—Manuel A. Antonakas
*Attorney, Agent, or Firm*—Hofgren, Wegner, Allen, Stellman & McCord

[57] ABSTRACT

Portable food service equipment adapted to be used in cafeterias or the like and which may be alternately used for food heating or cooling purposes. The exemplary embodiment includes a wheeled cart mounting an open topped container adapted to receive food. The container includes mounting means for alternately mounting electrical heating elements or the cooling coils of a refrigerating unit. The refrigerating unit is designed so that a portable compressor portion thereof may be supported by the cart wholly within the confines of the cart.

5 Claims, 8 Drawing Figures

PATENTED MAR 19 1974 3,797,563
SHEET 1 OF 2
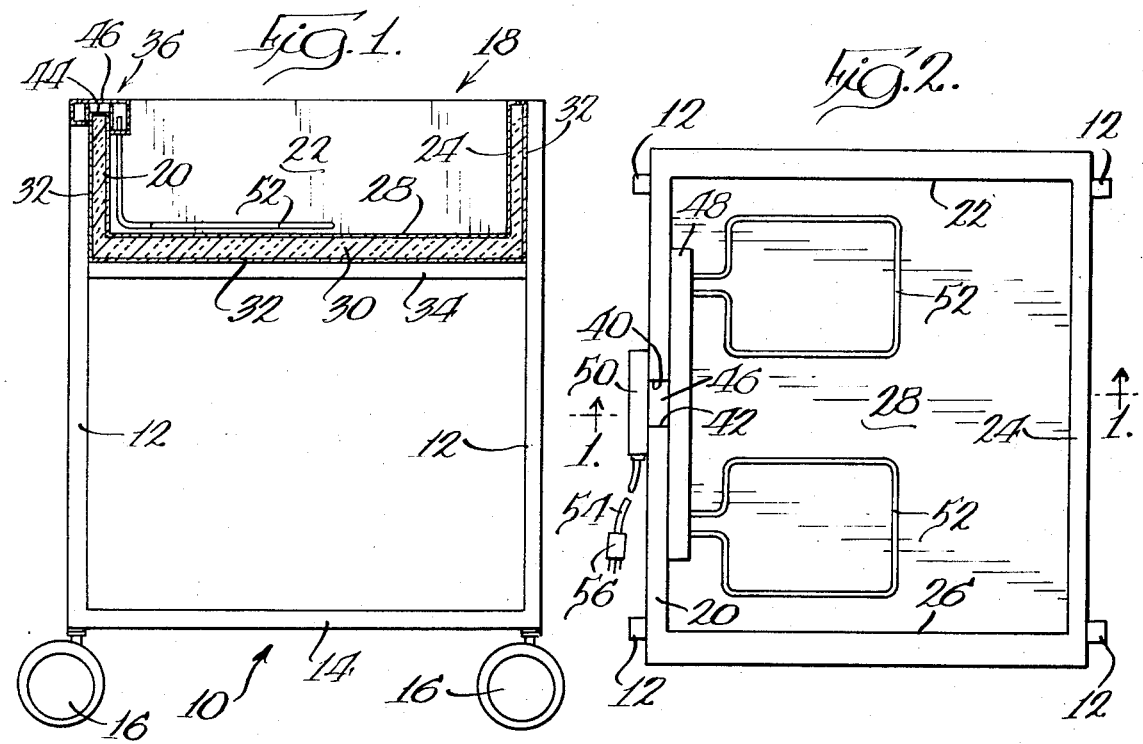
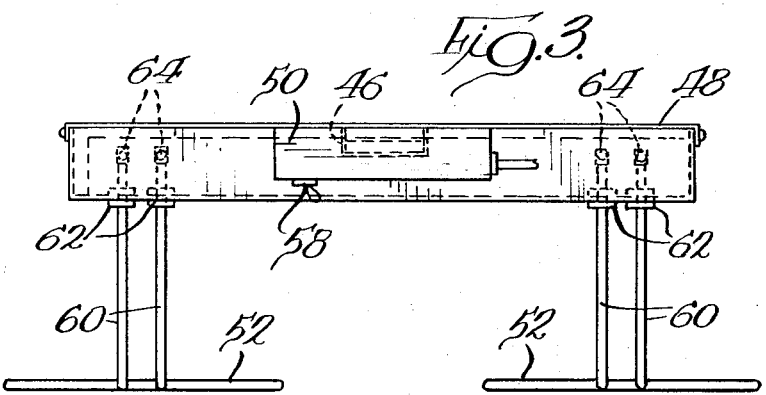
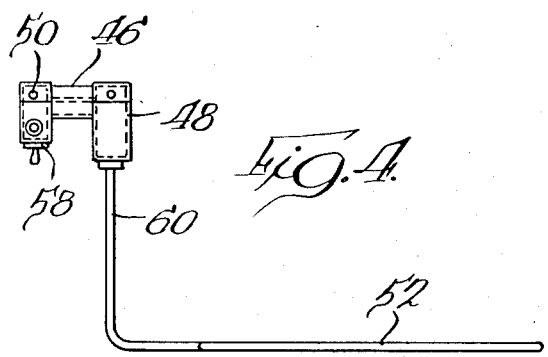
Inventors:
Carter Clifford Hoffmann
Richard R. Berger
By Hofgren, Wegner,
Allen, Stellman & McCord
Att'ys

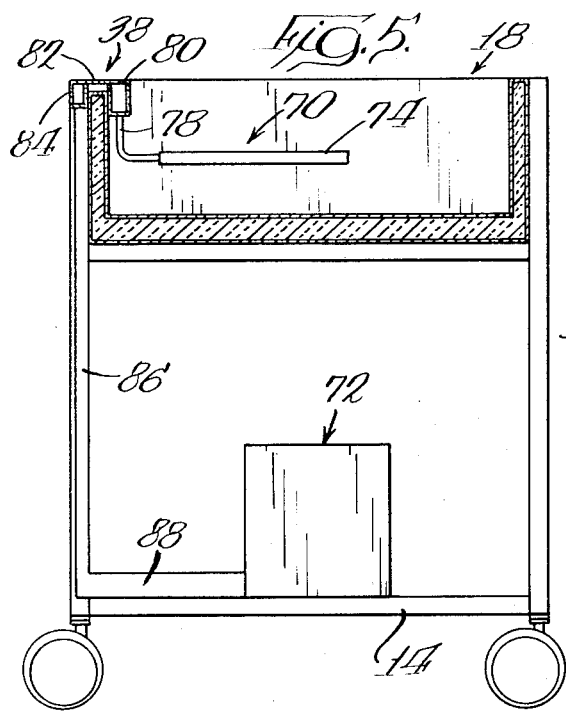
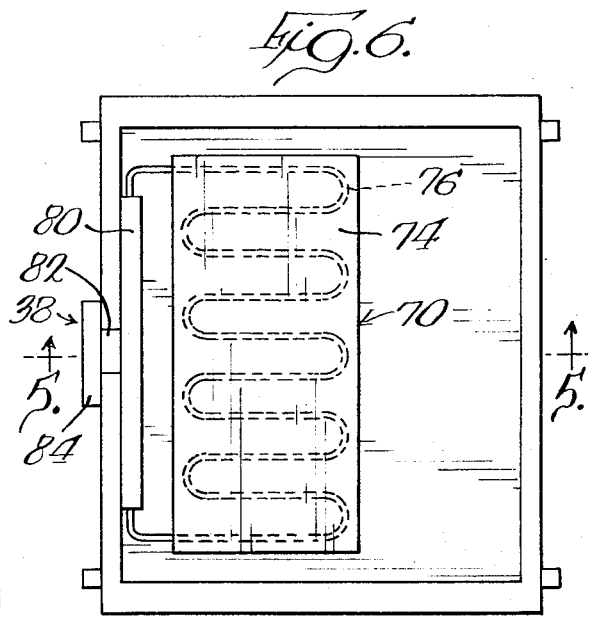
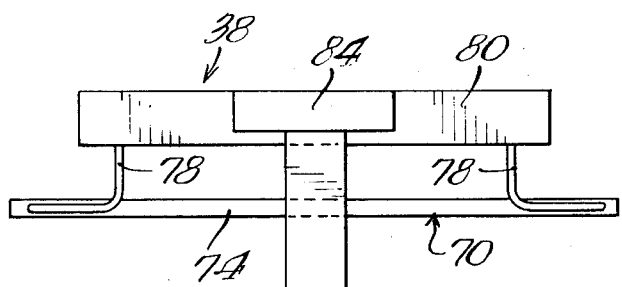
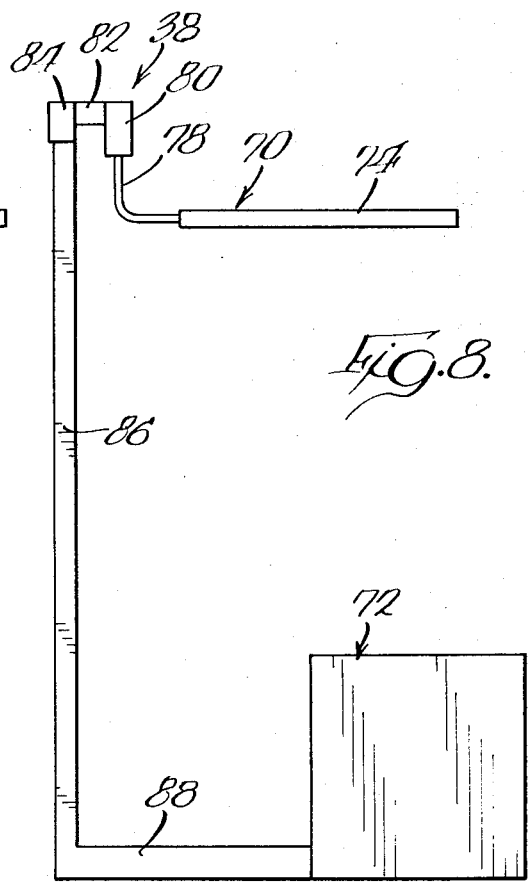

3,797,563

PORTABLE FOOD SERVICE EQUIPMENT

BACKGROUND OF THE INVENTION

This invention relates to food service equipment and more particularly, to food service equipment for use in cafeterias which may be easily converted from a food warming device to a food cooling device or vice versa as the daily needs of a particular food service establishment may require.

One difficulty often encountered in food service establishments is that of providing for fluctuating food heating and cooling requirements caused by the meal-to-meal and day-to-day variance in the menus. For example, for some meals, cooling requirements for specific foods may be relatively minimal, it only being necessary to provide for cooling of beverages or the like. However, should a cold salad or the like be offered at the next meal, additional cooling capacity may be required for cooling such an item in addition to beverage cooling. It will be recognized that heating requirements vary similarly.

SUMMARY OF THE INVENTION

It is the principal object of the invention to provide food service equipment that is readily convertible between food heating and food cooling uses so as to easily accommodate the food heating and cooling requirements that vary from day to day in food service establishments. More particularly, it is an object of the invention to provide such equipment that is of a portable nature to further enhance the flexibility of the equipment by allowing the same to be moved from place to place and into or out of a food service line as operations may require.

The exemplary embodiment of the invention achieves the foregoing objects by means of a structure including an upwardly open container having liquid impervious side walls and surrounded by a body of insulating material. One of the side walls includes mounting means for alternately receiving heating means or cooling means, both of which are adapted for receipt within the container so as to heat or cool food received in the container.

According to the preferred embodiment, the mounting means includes a notch at the upper edge of one side of the container in which may be received a neck portion extending between two elongated housings on either the food heating means or the food cooling means. In the case of the food cooling means, the exterior one of the elongated housings is connected to a compressor unit that may be disposed beneath the container. According to the preferred embodiment, the container is mounted on a wheeled cart and a compressor unit is supported wholly within the confines of the cart to provide a compact, convertible and portable unit.

Other objects and advantages of the invention will become apparent from the following specification taken in conjunction with the accompanying drawings.

DESCRIPTION OF THE DRAWINGS

FIG. 1 is a vertical section taken approximately along the line 1—1 of FIG. 2 illustrating the apparatus in a food heating mode;

FIG. 2 is a plan view of the apparatus in the food heating mode;

FIG. 3 is a side elevation of a heating means made according to the invention;

FIG. 4 is a side elevation of the heating means taken at right angles to the illustration of FIG. 3;

FIG. 5 is a vertical section taken approximately along the line 5—5 of FIG. 6 and showing the apparatus in a cooling mode;

FIG. 6 is a plan view of the apparatus in the cooling mode;

FIG. 7 is a side elevation of the cooling means; and

FIG. 8 is another side elevation of the cooling means taken at right angles to the illustration in FIG. 7.

DESCRIPTION OF THE PREFERRED EMBODIMENT

An exemplary embodiment of the invention arranged in a food heating mode is illustrated in FIGS. 1 and 2 and is seen to include a frame, generally designated 10, formed of four tubular uprights 12 interconnected at the lower ends by a plurality of cross members 14 (only one of which is shown). Depending from the cross member structure 14 are a plurality of wheels 16, two or more of which may be of the caster variety.

The upper ends of the tubular uprights 12 are joined by any suitable means to an upwardly open container, generally designated 18, in which food may be received. The container 18 includes side walls 20, 22, 24 and 26 and a bottom wall 28, all of which are liquid impervious and may be formed of stainless steel or the like. Exteriorly of the container defined by the walls 22–28, is a body of insulating material 30 which is in abutment with the external surfaces of the walls 22–28 and protected by outer panels 32 of stainless steel or the like to which the uprights 12 are joined. Finally, the container 18 may be supported in the position illustrated in FIG. 1 by one or more upper cross members 34.

The side wall 20 is provided with mounting means for releasably mounting a heating means, generally designated 36 and illustrated in FIGS. 1–4, or a cooling means generally designated 38 and illustrated in FIGS. 5–8. The mounting means for the elements are defined by a notch having vertical side walls 40 and 42 and a bottom wall 44. The notch thus defined is adapted to snugly receive a neck on either the heating means 36 or the cooling means 38.

With reference to FIGS. 1–4, the neck for the heating means 36 is designated 46 and is tubular in configuration, joining a pair of elongated housings 48 and 50. The housing 48 is adapted to be disposed interiorly of the container 18 and mounts heating elements 52 for receipt within the container 18.

The housing 50 is adapted to be located exteriorly of the container 18 and includes an outlet cord 54 terminating in a plug 56 for connection to a source of electrical power. In addition, the underside of the housing 50 may mount a toggle switch 58.

The heating elements 52 are generally loop shaped in configuration and terminate in upwardly extending ends 60 which may pass through heat insulating standoffs 62 in the housing 48 to terminate in terminals 64 within the housing 48. In a conventional manner, by conductors (not shown) and connected to the cord 56, electrical power may be applied to the heating elements 52 via the toggle switch 58. Such conductors may pass from the housing 50 to the housing 48 via the tubular neck 46. If desired, the switch 58 may be multiple-position and through conventional circuitry provide a variety of temperature ranges for the heating elements 52.

In the heating mode as just described, the container 18 may be filled with water to be heated by the elements and food in other containers placed in the water or suspended thereabove by the upper edges of the container 18 in a manner well-known.

Turning now to FIGS. 5–8, the cooling means 38 will be described in detail. More particularly, the same includes a cooling portion, generally designated 70 which may be disposed within the container 18 and a compressor unit, generally designated 72, which may be supported on a shelf defined by the cross members 14 and within the confines of the cart. The cooling portion 70 may include a plate-like housing 74 containing refrigerant coils 76 arranged in a serpentine configuration as illustrated in FIG. 6. At opposite ends of the housing 74, the coils 76 emerge to be directed upwardly as at 78 for connection to an elongated housing 80 adapted to be disposed within the interior of the container 18. The housing 80 is connected via a neck 82 of a tubular configuration to a housing 84 adapted to be disposed exteriorly of the container 18. The housing 84 in turn is joined to a downwardly extending tube 86 preferably having a width no greater than that of the uprights 12 and of a length sufficient to have its lowermost extremity adjacent the upper surface of the cross members 14. At this point, the tube 86 joins to a horizontally extending tube 88 which in turn is joined to the compressor unit 72. Suitable refrigerant conduits interconnect the compressor unit 72 with the cooling portion 70 via the tubes 88, 86, the exteriorly located housing 84, the neck 82 and the interiorly located housing 80.

The compressor unit 72 may be of conventional construction and operated by electric power to cool and circulate the refrigerant through the coil 76 so that, for example, a body of water received in the container 18 may be cooled to in turn cool food in containers in contact therewith or, alternately, to cool food in containers directly placed on the housing 74.

From a comparison of FIGS. 1–4 and FIGS. 5–8, it will be recognized that the interiorly located housings 48 and 80, the exteriorly located housings 50 and 84 and the necks 40 and 82 serve identical functions in respective modes of operation of the apparatus. In each case, the length of the neck is approximately equal to the thickness of the container wall including the body of insulation while the width of the same as well as its vertical dimension approximately corresponds to the same dimensions of the notch defined by the walls 40, 42 and 44 in the side wall 20. The greater dimensions of the two housings on opposite sides of the side wall serve to snugly hold the respective unit in the desired position.

It will be appreciated that the heating means and cooling means are readily interchangeable to convert the food serving equipment in the form of a cart between cooling and heating modes as may be necessary. In the case of either, it is only necessary to lift the heating means or the cooling means 38 sufficiently that the depending heating elements 52 or the cooling portion 70 clear the upper extremity of the side walls 20 whereupon the units may be moved horizontally and the other unit mounted by the notch by reversing the just-described movement. Thus, converting the equipment from one mode to the other is a relatively simple matter. Moreover, the configuration of the cooling means 36 is such that it may be received entirely within the confines of the cart structure to minimize bulk. Finally, the portability of the device renders the same particularly suitable for movement to and from service lines as a given day's or meal's menu may require.

We claim:

1. Interchangeable heating and cooling food service equipment comprising: a container having liquid impervious side and bottom walls and an open top adapted to receive food containers; a body of insulating material exterior of said container and in insulating engagement therewith; mounting means formed in one of said side walls; an electrical heating unit adapted to be received by said mounting means, said electrical heating unit including electrical heating elements for receipt within said container and electrical connection portions adapted to be exteriorly located of said container when said electrical heating unit is received in said mounting means; and a refrigerating unit adapted to be received in said mounting means, said refrigerating unit including a cooling portion adapted to be disposed within said container and a compressor unit adapted to be disposed exteriorly of said container when said refrigerating unit is received in said mounting means; each of said electrical heating unit and said refrigerating unit including means for selective cooperative attachment to said mounting means; support means for said container, said support means comprising a wheeled cart whereby said container may be moved to a desired location of use in a cafeterial or the like, said cart being provided with compressor support means for supporting said compressor unit within the confines of said cart; said mounting means comprising a notch formed in said side wall, each of said heating unit and said refrigerating unit including elongated housing structure adapted to be received within said container and elongated housing structure adapted to be exterior of said container, said housing structures being interconnected by a neck structure having a length approximately equal to the thickness of said container and said insulating means adjacent said notch and a width approximately equal to the width of said notch.

2. Food service equipment comprising:
    an upwardly open, liquid impervious container;
    a body of insulating material exterior of said container and in insulating engagement therewith;
    a protective sheath for said body of insulating material and sandwiching the insulating material between the protective sheath and the container;
    means defining a base;
    means connecting said base to said protective sheath;
    a plurality of wheels on said base whereby the entire assemblage may be easily transported;
    a notch extending through said protective sheath, said body of insulating material and said container at the upper end of the latter; and
    heat transfer means including a heat transfer portion secured in said container and a mounting portion having a narrowed neck received in said notch.

3. Food service equipment comprising:

an upwardly open, liquid impervious container;
a body of insulating material exterior of said container and in insulating engagement therewith;
a protective sheath for said body of insulating material and sandwiching the insulating material between the protective sheath and the container;
means defining a base;
means connecting said base to said protective sheath;

a plurality of wheels on said base whereby the entire assemblage may be easily transported;
a notch extending through said protective sheath, said body of insulating material and said container at the upper end of the latter; and
heating means, said heating means being removably received in said notch and including a first housing located within said container and a second housing located exterior of said protective sheath, neck means interconnecting said housings and received in said notch, at least one heating element depending from said first housing and located within said container, electrical conductor means extending from said second housing and adapted to be connected to a source of electric power, electric control means on said second housing, said neck being adapted to contain electrical conductors from said heating element to said electrical control means.

4. Food service equipment comprising:
an upwardly open, liquid impervious container;
a body of insulating material exterior of said container and in insulating engagement therewith;
a protective sheath for said body of insulating material and sandwiching the insulating material between the protective sheath and the container;
means defining a base;
means connecting said base to said protective sheath;

a plurality of wheels on said base whereby the entire assemblage may be easily transported;
a notch extending through said protective sheath, said body of insulating material and said container at the upper end of the latter;
said base further including a support; said equipment further including cooling means, said cooling means including a first housing within said container and a second housing exterior of said container, a neck in said notch and interconnecting said first and second housings, a cooling coil within said container and depending from said first housing a compressor unit located on said support, and refrigerant conduit means extending from said compressor unit to said second housing, said neck being adapted to receive refrigerant conduits to interconnect said cooling coil and said first-mentioned refrigerant conduits.

5. Food service equipment comprising:
an upwardly open, liquid impervious container;
a body of insulating material exterior of said container and in insulating engagement therewith;
a protective sheath for said body of insulating material and sandwiching the insulating material between the protective sheath and the container;
means defining a base;
means connecting said base to said protective sheath;

a plurality of wheels on said base whereby the entire assemblage may be easily transported;
a notch extending through said protective sheath, said body of insulating material and said container at the upper end of the latter; and
heat transfer means adapted to be received in said container, said heat transfer means including a first elongated housing received within said container near said upper end thereof and mounting a depending heat transfer element for disposition within said container, a second, elongated housing located exterior of said protective cover, and a neck of a size and shape approximating that of said notch interconnecting said housings within said notch to removably mount said heat transfer means in said container.

* * * * *